(12) United States Patent
Suzuki et al.

(10) Patent No.: US 8,272,700 B2
(45) Date of Patent: Sep. 25, 2012

(54) VEHICLE BRAKE APPARATUS

(75) Inventors: Jiro Suzuki, Nagano (JP); Koji Sakai, Nagano (JP); Kazuhiro Tagata, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1216 days.

(21) Appl. No.: 12/057,776

(22) Filed: Mar. 28, 2008

(65) Prior Publication Data

US 2008/0236962 A1    Oct. 2, 2008

(30) Foreign Application Priority Data

Mar. 30, 2007  (JP) ............................... P.2007-095595

(51) Int. Cl.
*B60T 8/44* (2006.01)
*B60T 13/20* (2006.01)

(52) U.S. Cl. .................... 303/114.1; 303/2 D; 188/358; 188/359; 60/554

(58) Field of Classification Search ............... 303/20, 303/114.1; 188/358, 359; 60/533–594
See application file for complete search history.

(56) References Cited

U.S. PATENT DOCUMENTS

| | | | |
|---|---|---|---|
| 6,513,884 B2* | 2/2003 | Nishii et al. | 303/114.1 |
| 6,578,932 B2* | 6/2003 | Sakata | 303/114.1 |
| 2002/0017820 A1* | 2/2002 | Nishii et al. | 303/114.1 |
| 2002/0093243 A1 | 7/2002 | Nitta et al. | |
| 2002/0096936 A1* | 7/2002 | Ishida et al. | 303/114.1 |
| 2005/0236890 A1* | 10/2005 | Matsuno et al. | 303/114.1 |
| 2006/0158026 A1* | 7/2006 | Aoki et al. | 303/114.1 |
| 2006/0220451 A1* | 10/2006 | Drumm | 303/114.1 |

FOREIGN PATENT DOCUMENTS

| | | |
|---|---|---|
| DE | 10 2004 025 638 | 5/2004 |
| JP | 8067242 | 3/1996 |
| JP | 2002264795 | 9/2002 |
| JP | 2003160045 | 6/2003 |
| JP | 2003327109 | 11/2003 |
| JP | 2007038698 | 2/2007 |

OTHER PUBLICATIONS

Office Action for Japanese Application No. JP2007-095595 dated Oct. 14, 2010 (English language translation attached), Dispatch date Oct. 20, 2010.
Extended European Search for corresponding European Application No. 08006332.4 dated Oct. 19, 2010.
Office Action for Japanese Application No. JP2007-095595 dated Apr. 28, 2011, (English language translation attached), Dispatch date May 11, 2011.

* cited by examiner

*Primary Examiner* — Bradley King
*Assistant Examiner* — Mahbubur Rashid
(74) *Attorney, Agent, or Firm* — Andrew M. Calderon; Roberts Mlotkowski Safran & Cole, P.C.

(57) ABSTRACT

A pressure regulating valve unit 7 is configured to be electrically driven according to a detection value of a detection unit 74 adapted to detect an amount of brake application effort made by a brake operation member 5 so as to switch states of the vehicle brake apparatus between a state where a boosted hydraulic pressure chamber 9 is made to communicate with a hydraulic pressure generating source 6 while a communication between the boosted hydraulic pressure chamber 9 and a reservoir R is interrupted, a state where the communication between the boosted pressure chamber 9 and the hydraulic pressure generating source 6 is interrupted while the boosted pressure chamber 9 is made to communicate with the reservoir R, and a state where the boosted hydraulic pressure chamber 9 is disconnected from both the hydraulic pressure generating source 6 and the reservoir R.

20 Claims, 4 Drawing Sheets

VEHICLE BRAKE APPARATUS

BACKGROUND OF THE INVENTION

1. Field of the Invention

The present invention relates to a vehicle brake apparatus including a master cylinder having a master piston of which back side faces a boosted hydraulic pressure chamber and a casing accommodating the master piston in a slidable manner, a hydraulic pressure generating source, a reservoir, and a pressure regulating valve unit adapted to regulate an output hydraulic pressure of the hydraulic pressure generating source in response to an input of brake application effort from a brake operation member for application to the boosted hydraulic pressure chamber, the master cylinder being connected to wheel brakes.

2. Description of Related Art

A vehicle brake apparatus like one described above is known in, for example, Japanese Patent Unexamined Publication No. JP-A-2002-264795.

In the conventional brake system described above, however, the pressure regulating valve unit is configured to mechanically operate in response to an input of brake application effort. Since this configuration makes the construction of the pressure regulating valve unit complex and also permits only a pressure regulation at a predetermined pressure in response to the input of brake application effort, when attempting to apply this very brake system to other model lines each having a different specification, a newly specified pressure regulating valve unit has to be prepared in consideration of boost ratio, stroke and the like which are specific to a model line to which the brake system is attempted to be applied, this increasing the number of kinds of components parts involved.

SUMMARY OF THE INVENTION

The invention has been made in view of the situations, and an object thereof is to provide a vehicle brake apparatus including a pressure regulating valve unit which is adapted to be applied to model lines each having a different specification without involving any adaptation so as to avoid the increase in the number of kinds of components involved and of which the configuration is simplified.

With a view to attaining the object, according to a first aspect of the invention, there is provided a vehicle brake apparatus including:

a boosted hydraulic pressure chamber;
a master cylinder including:
  a master piston of which back side faces the boosted hydraulic pressure chamber; and
  a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber; and
a detection unit which detects an amount of the brake application effort of the brake operation member,
wherein the master cylinder is connected to wheel brakes; and
in accordance with a detection value of the detection unit, the pressure regulating valve unit is electrically driven to switch over following states of the vehicle brake apparatus:

a state where the boosted hydraulic pressure chamber communicates with the hydraulic pressure generating source and the boosted hydraulic pressure chamber is separated from the reservoir;
a state where the boosted pressure chamber is separated from the hydraulic pressure generating source and the boosted pressure chamber communicates with the reservoir; and
a state where the boosted hydraulic pressure chamber is separated from both the hydraulic pressure generating source and the reservoir.

In addition, according to a second aspect of the invention, there is provided a vehicle brake apparatus as set forth in the first aspect of the invention, the pressure regulating valve unit includes:
  a primary linear solenoid valve which is interposed between the hydraulic pressure generating source and the boosted hydraulic pressure chamber; and
  a secondary linear solenoid valve which is interposed between the boosted hydraulic pressure chamber and the reservoir.

Furthermore, according to a third aspect of the invention, there is provided a vehicle brake apparatus as set forth in the first aspect of the invention, the master piston is formed into a stepped configuration in which a boosted-hydraulic-side thereof is reduced in diameter.

According to the first aspect of the invention, since the pressure regulating valve unit is electrically driven according to the amount of brake application effort of the brake operation member, the boost ratio can freely be changed according to a model line to which the brake system is applied and also the brake system is allowed to be applied to many model lines each having a different specification with the simple configuration, thereby making it possible to avoid an increase in the number of kinds of components involved.

In addition, according to the second aspect of the invention, the pressure regulating valve unit is allowed to have the simple configuration which is made up of the two linear solenoid valves.

Furthermore, according to the third aspect of the invention, the amount of brake fluid which is applied to the boosted hydraulic pressure chamber is suppressed to a small level to thereby suppress the amount of fluid consumed by the hydraulic pressure generating source, thereby making it possible to reduce the size of the hydraulic pressure generating source.

DETAILED DESCRIPTION OF THE PREFERRED EMBODIMENTS

Hereinafter, embodiments of the invention will be described accompanying with drawings.

Figure 1:
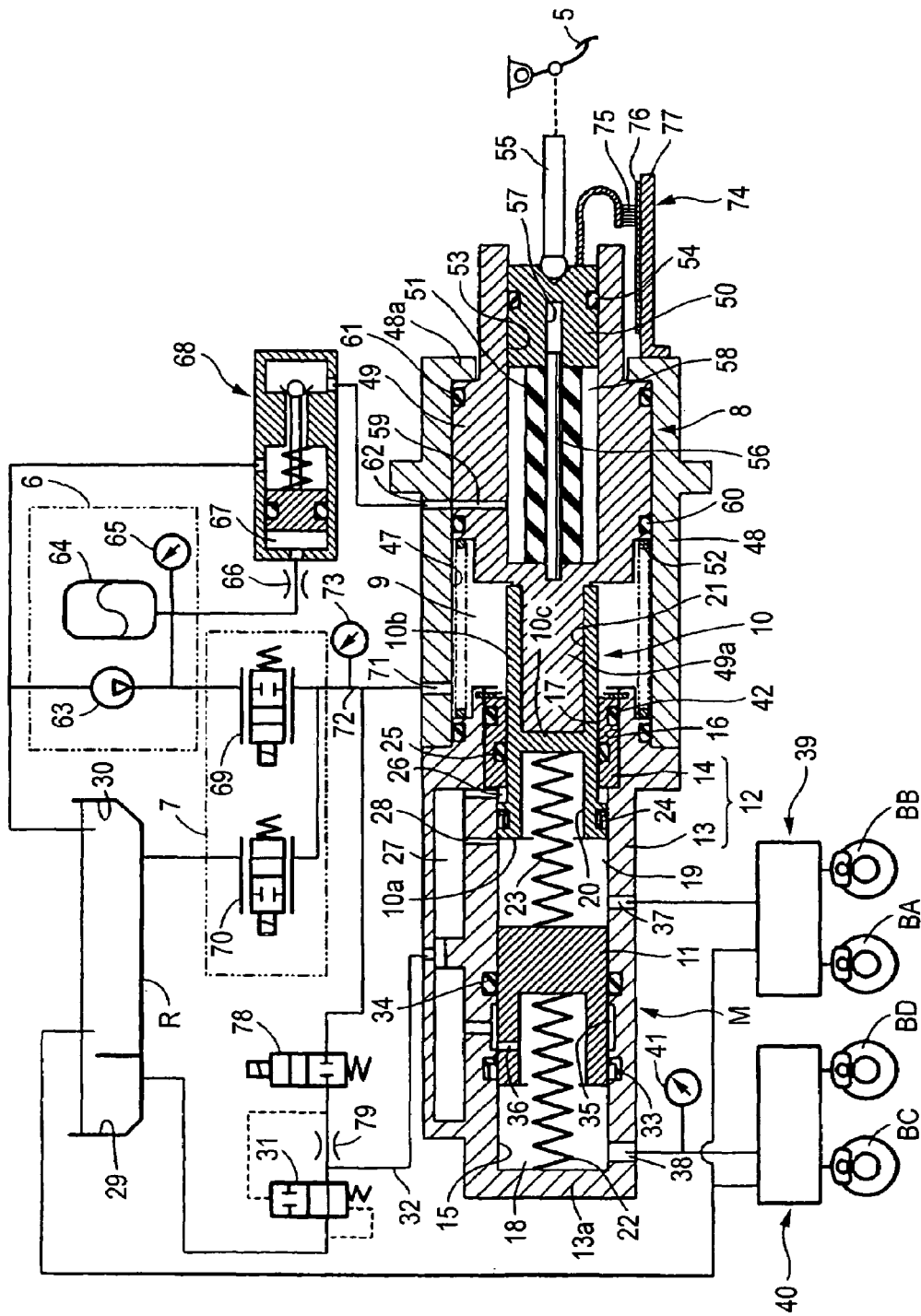
FIG. 1 is a brake hydraulic pressure system diagram showing an overall configuration of a vehicle brake apparatus of a first embodiment.
Figure 2:
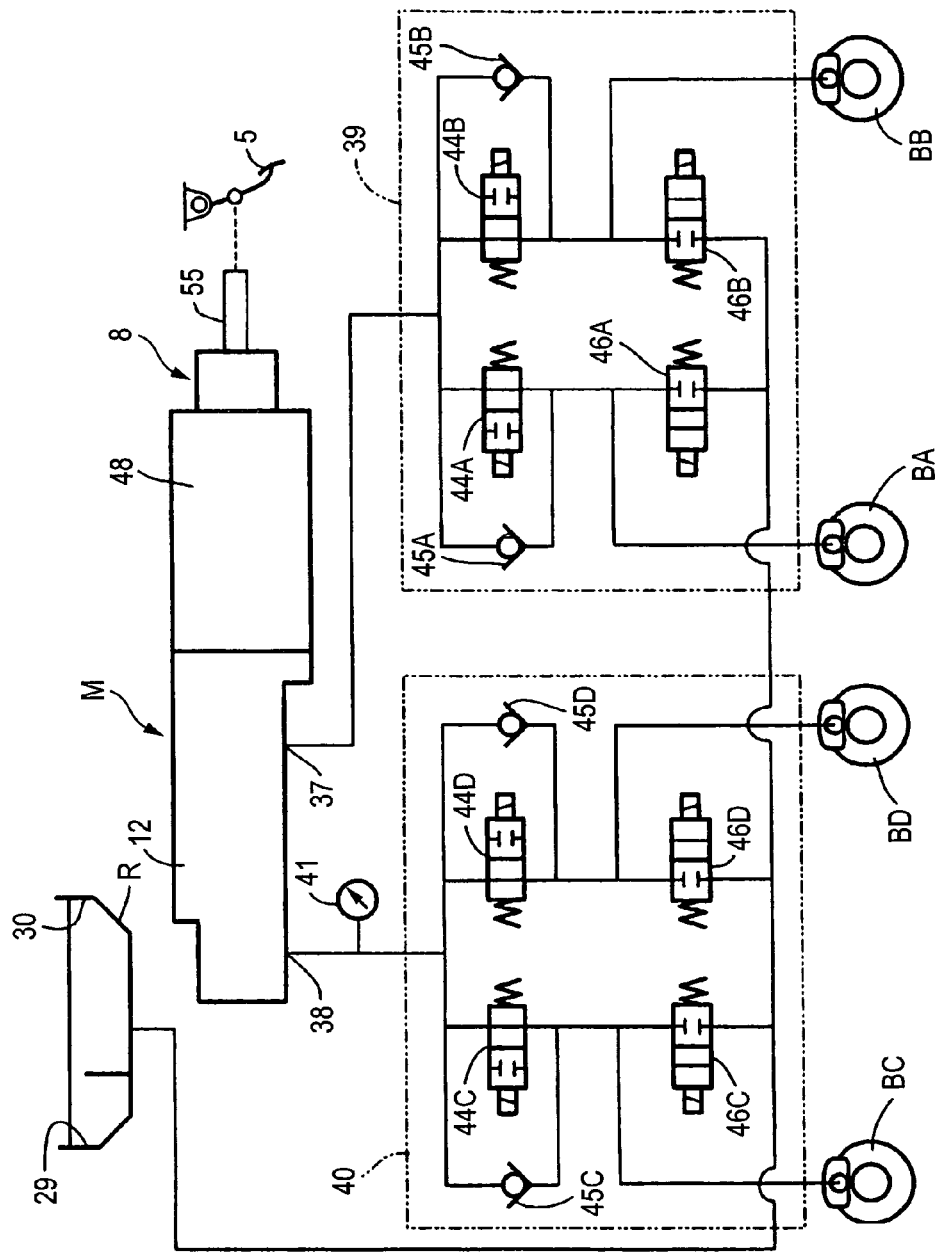
FIG. 2 is a hydraulic pressure circuit diagram showing the configuration of a hydraulic pressure modulator.

FIGS. 1 and 2 are such as to shown a first embodiment of the invention, of which FIG. 1 is a brake hydraulic pressure system diagram showing an overall configuration of a vehicle brake apparatus, and FIG. 2 is a hydraulic pressure circuit diagram showing the configuration of a hydraulic pressure modulator.

Firstly, in FIG. 1, a brake system of a four-wheel vehicle includes a tandem type master cylinder M, a pressure regulator valve unit 7 adapted to regulate the hydraulic pressure of a hydraulic pressure generating source 6 in response to an input of brake application effort from a brake pedal 5 functioning as a brake operation member for application to the master cylinder M, and a stroke simulator 8 adapted to simulate an operation stroke of the brake pedal 5.

In the master cylinder M, a rear master piston 10, of which back side faces a boosted hydraulic pressure chamber 9 and which is biased rearwards by a spring, and a front master piston 11, which is disposed in front of the rear master piston 10 while being biased rearwards by a spring, are slidably fitted in a primary casing 12.

The primary casing 12 includes a cylinder body 13 and a cylindrical sleeve 14 which is fitted in and fixed in the cylinder body 13.

The cylinder body 13 is provided with a primary cylinder bore 15 which is closed at a front end thereof by an end wall 13a and a fitting bore 16 which is formed larger in diameter than the primary cylinder bore 15 so as to continue coaxially to a rear part of the primary cylinder bore 15.

The sleeve 14 is fitted in and fixed in the fitting bore 16 so as to define a secondary cylinder bore 17 which is made smaller in diameter than the primary cylinder bore 15 and is made to continue coaxially to a rear end of the primary cylinder bore 15.

The front master piston 11 is formed into a bottomed cylindrical shape which is opened at a front end so as to define a front output hydraulic pressure chamber 18 with the front end wall 13a and is slidably fitted in the primary cylinder bore 15.

The rear master piston 10 is slidably fitted in the primary and secondary cylinder bores 15, 17 so as to define a rear output hydraulic pressure chamber 19 with the front master piston 11. Namely, the rear master piston 10 includes a large diameter portion 10a which is slidably fitted in the primary cylinder bore 15 with its front facing the rear output hydraulic pressure chamber 19 and a small diameter portion 10b which is slidably fitted in the secondary cylinder bore 17 with its rear end being faced the boosted hydraulic pressure chamber 9 which are arranged in such a manner that the small diameter portion 10b coaxially continue to the large diameter portion 10a.

The rear master piston 10 is also formed into a stepped shape in which an end thereof which lies to face the boosted hydraulic pressure chamber 9 is reduced in diameter. Moreover, in the rear master piston 10, a primary recess portion 20 which is opened at an end thereof which lies to face the rear output hydraulic pressure chamber 19 and a secondary recess portion 21 which is opened at an end thereof which lies to face the boosted hydraulic pressure chamber 9 are provided coaxially so as to align via a bulkhead 10c.

In the front output hydraulic pressure chamber 18, a front return spring 22, which is provided in a compressed state between the closed end of the front master piston 11 which is formed into the bottomed cylindrical shape and the end wall 13a, is accommodated so as to exhibit a spring force which biases the front master piston 11 rearwards.

In the rear output hydraulic pressure chamber 19, a rear return spring 23, which is provided in a compressed state between the bulkhead 10c of the rear master piston 10 and the front master piston 11, is accommodated so as to bias the rear master piston 10 rearwards.

A rear lip seal 24 is mounted on an outer circumference of the large diameter portion 10a of the rear master piston 10 so as to be brought into sliding contact with an inner circumference of the primary cylinder bore 15. An annular seal member 25 is mounted on an inner circumference of the sleeve 14 or an inner circumference of the secondary cylinder bore 17 so as to be brought into sliding contact with an outer circumference of the small diameter portion 10b. An annular seal member 42 is mounted on an outer circumference of the sleeve 14 so as to be brought into spring contact with an inner circumference of the fitting hole 16.

Thus, between the rear seal lip seal 24 and the annular seal member 25, a rear annular fluid chamber 26 is defined between the primary casing 12 and the rear master piston 10. This rear lip seal 24 is adapted to permit a flow of brake fluid from the rear annular fluid chamber 26 to the rear output hydraulic pressure chamber 19 side when the hydraulic pressure in the rear output hydraulic pressure chamber 19 becomes lower than the hydraulic pressure in the rear annular fluid chamber 26.

In addition, a common fluid chamber 27, communicating with the rear annular fluid chamber 26, is formed in the cylinder main body 13 so as to extend in parallel with the primary cylinder bore 15. A relief hole 28 is provided in the cylinder body 13 so as to establish a communication between the rear output hydraulic pressure chamber 19 and the common fluid chamber 27 when the rear master piston 10 lies in a withdrawal limit position in which the large diameter portion 10a of the rear master piston 10 is brought into abutment with the sleeve 14. The common fluid chamber 27 communicates with a primary hydraulic pressure path 32 which is connected to a primary fluid reservoir chamber 29 of the reservoir R via a primary opening and closing valve 31 which opens and closes arbitrarily while being closed through a pilot operation.

A front lip seal 33, which sliding contacts with the outer circumference of the front master piston 11, and an annular seal member 34, which sliding contacts with the outer circumference of the front master piston 11 in a position lying further rearwards than the front lip seal 33, are mounted on the inner circumference of the primary cylinder bore 15 so as to be spaced apart from each other in an axial direction.

A front annular fluid chamber 35 communicating with the common fluid chamber 27 is defined between the inner circumference of the primary cylinder bore 15 and the outer circumference of the front master piston 11 between the front lip seal 33 and the annular seal member 34.

Thus, the front seal lip 33 permits a flow of brake fluid from the front annular fluid chamber 35 to the front output hydraulic pressure chamber 18 side when the hydraulic pressure in the front output hydraulic pressure chamber 18 becomes lower than the hydraulic pressure in the front annular fluid chamber 35. In addition, a relief hole 36 is provided in the front master piston 11 which establishes a communication between the front annular fluid chamber 35 and the front output hydraulic pressure chamber 18 when the front master piston 11 comes to lie in its withdrawal limit position.

Provided in the cylinder body 13 are a rear output port 37 which outputs the hydraulic pressure of the rear output pressure chamber 19 in which a high pressure is developed as the rear master piston travels forwards and a front output port 38 which outputs the hydraulic pressure of the front output hydraulic pressure chamber 18 in which a high pressure is developed as the front master piston 11 travels forwards.

Moreover, the rear output port 37 is connected to wheel brakes BA, BB for a right front wheel and a left rear wheel via a primary hydraulic pressure modulator 39, while the front output port 38 is connected to wheel brakes EC, BD for a left front wheel and a right rear wheel via a second hydraulic pressure modulator 40. In addition, a hydraulic pressure sensor 41 is connected to the front output port 38.

In FIG. 2, the primary hydraulic pressure modulator 39 includes:

a normally open solenoid valve 44A which is interposed between the rear output port 37 and the wheel brake BA for the right front wheel;

a normally open solenoid valve 44B which is interposed between the rear output port 37 and the wheel brake BB for the left rear wheel;

one-way valves 45A, 45B which are connected in parallel, respectively, to both the normally open solenoid valves 44A, 44B so as to permit a flow of brake fluid to the rear output port 37 side;

a normally closed solenoid valve 46A which is interposed between the wheel brake BA for the right front wheel and a secondary fluid reservoir chamber 30 of the reservoir R; and a normally closed solenoid valve 46B which is interposed between the wheel brake BB for the left rear wheel and the secondary fluid reservoir chamber 30 of the reservoir R.

In addition, the secondary hydraulic pressure modulator 40 includes:

a normally open solenoid valve 44C which is interposed between the front output port 38 and the wheel brake BC for the left front wheel, a normally open solenoid valve 44D which is interposed between the front output port 38 and the wheel brake BD for the right rear wheel, one-way valves 45C, 45D which are connected in parallel, respectively, to both the normally open solenoid valves 44C, 44D so as to permit a flow of brake fluid to the front output port 38 side, a normally closed solenoid valve 46C which is interposed between the wheel brake BC for the left front wheel and the secondary fluid reservoir chamber 30 of the reservoir R, and a normally closed solenoid valve 46D which is interposed between the wheel brake BD for the right rear wheel and the secondary fluid reservoir chamber 30 of the reservoir R.

According to the primary and secondary hydraulic pressure modulators 39, 40 which are configured as has been described above, the brake hydraulic pressures outputted from the rear and front output ports 37, 38 can freely be regulated. An anti-lock brake control, a traction control in a non-brake operated state and an automatic brake control can be executed by the primary and secondary modulators 39, 40 which can so control the hydraulic pressures.

Referring again to FIG. 1, the stroke simulator 8 has a tertiary cylinder bore 47 which is coaxial with the primary and secondary cylinder bores 15, 17 and is formed larger in diameter than the primary and secondary cylinder bores 15, 17. Further, the stroke simulator 8 includes:

a secondary casing 48 which is connected fluid tightly and coaxially with a rear part of the primary casing 12, a backup piston 49 which defines the boosted hydraulic pressure chamber 9 which a rear part of the rear master piston 10 is made to face in the master cylinder M with a rear end of the primary casing 12 and which is slidably fitted in the tertiary cylinder bore 47, an input piston 50 which is fitted in the backup piston 49 so as to travel in the axial direction relative to the backup piston 49, an elastic element 51 which is interposed between the input piston 50 and the backup piston 49, and a spring 52 which is provided in a compressed state between the primary casing 12 and the backup piston 49.

The backup piston 49 is slidably fitted in the tertiary cylinder bore 47 in such a manner that its withdrawal limit position is restricted by an inwardly extending flange portion 48a which is provided at a rear end of the secondary casing 48.

Moreover, a fitting projection 49a is provided coaxially at a front end of the backup piston 49 so as to project therefrom, and this fitting projection 49a is fitted in the secondary recess portion 21 provided in the rear master piston 10 in the master cylinder M so as to travel relatively in the axial direction while adapted to be brought into abutment with a closed end of the secondary recess portion 21 or the bulkhead 10c at a leading end thereof.

In addition, a bottomed primary sliding bore 53 is provided coaxially in the backup piston 49. The input piston 50, on an outer circumference of which an annular seal member 54 is mounted so as to be brought into sliding contact with an inner circumference of the primary sliding bore 53, is slidably fitted in the primary sliding bore 53. A front end portion of an input rod 55, which continues to the brake pedal 5, is continuously connected to the input piston 50 so as to freely pivot. Namely, a brake application effort according to the operation or depression of the brake pedal 5 is inputted into the input piston 50 via the input rod 55. Thus, the input piston 50 travels forwards in response to the input of the brake application effort.

The elastic element 51 is such as to be formed into a cylindrical shape of an elastic material such as rubber so as to have a small diameter than an inside diameter of the primary sliding bore 53 in a natural state where no external force is applied thereto. A front end of a guide shaft 56 which passes through the elastic element 51 is fitted in a front end wall of the primary sliding bore 53 in the backup piston 49. In addition, a bottomed secondary sliding bore 57, which is opened at a front end thereof, is provided in the input piston 55, and a rear part of the guide shaft 56 is slidably fitted in the secondary sliding bore 57.

Incidentally, an annular fluid chamber 58 is defined between an outer circumference of the elastic element 51 and the inner circumference of the primary sliding bore 53. A communication hole 59, communicating with the annular fluid chamber 58, is provided in the backup piston 49. Moreover, a pair of seal members 60, 61 are mounted on the outer circumference of the backup piston 49 so as to hold the communication hole 59 therebetween from both sides thereof in the axial direction and to be brought into sliding contact with an inner circumference of the tertiary cylinder bore 47. A communication hole 62 is provided in the secondary casing 48 which opens to an inner surface of the tertiary cylinder bore 47 between the seal members 60, 61 irrespective of axial travel of the backup piston 49.

The hydraulic pressure generating source 6 includes:

a pump 63 which discharges brake fluid pumped up from the secondary fluid reservoir chamber 30 of the reservoir R;

an accumulator 64 which communicates with a discharge port of the pump 63; and a hydraulic pressure sensor 65 adapted to detect a hydraulic pressure accumulated in the accumulator 6 so as to control the operation of the pump 63.

A pilot operation type secondary opening and closing valve 68 having a pilot chamber 67 connected to the hydraulic pressure generating source 6 via a first constriction 66 is interposed between the communication hole 62 provided in the secondary casing 48 and the secondary fluid reservoir chamber 30 of the reservoir R.

Thus, when the hydraulic pressure in the pilot chamber 67 is sufficiently high, the secondary opening and closing valve 68 opens to make the communication hole 62 communicate with the secondary fluid reservoir chamber 30, while when the hydraulic pressure in the pilot chamber 67 lowers due to the hydraulic pressure generating source 6 failing, the secondary opening and closing valve 68 closes to disconnect the communication hole 62 from the secondary fluid reservoir chamber 30, so as to hold the annular fluid chamber 58 in the stroke simulator 8 in a hydraulically locked state.

The pressure regulating valve unit 7, which regulates the hydraulic pressure of the hydraulic pressure generating source 6 in response to the input of brake application effort from the brake pedal 5 for application of the regulated pressure to the master cylinder M, is configured to be electrically driven so as to switch over following states (a) through (c) of the vehicle brake apparatus:

(a) a state where the boosted hydraulic pressure chamber 9 communicates with the hydraulic pressure generating source 6 and the boosted hydraulic pressure chamber 9 is separated from the secondary fluid reservoir chamber 30 of the reservoir R;

(b) a state where the boosted pressure chamber 9 is separated from the hydraulic pressure generating source 6 and the boosted pressure chamber 9 communicates with the secondary fluid reservoir chamber 30 of the reservoir R; and (c) a state where the boosted hydraulic pressure chamber 9 is separated from both the hydraulic pressure generating source 6 and the secondary fluid reservoir chamber 30 of the reservoir R.

The pressure regulating valve unit 7 includes a normally closed primary linear solenoid valve 69 interposed between the hydraulic pressure generating source 6 and the boosted hydraulic pressure chamber 9 and a normally open secondary linear solenoid valve 70 interposed between the boosted hydraulic pressure chamber 9 and the secondary fluid reservoir chamber 30 of the reservoir R.

A secondary hydraulic pressure path 72 is connected to a communication hole 71 which is provided in the secondary casing 48 so as to communicate with the boosted hydraulic pressure chamber 9.

The primary linear solenoid valve 69 is interposed between the secondary hydraulic pressure path 72 and the hydraulic pressure generating source 6 to switch the status of a path between the hydraulic pressure generating source 6 and the secondary hydraulic pressure path 72 between a communication established state and a communication interrupted state.

The secondary linear solenoid valve 70 is interposed between the secondary hydraulic pressure path 72 and the secondary fluid reservoir chamber 30 of the reservoir R to switch the status of a path between the secondary hydraulic pressure path 72 and the secondary fluid reservoir chamber 30 between a communication established state and a communication interrupted state.

Further, a hydraulic pressure sensor 73 is connected to the secondary hydraulic pressure path 72.

According to the pressure regulating valve unit 7 that is configured as has been described above, the output hydraulic pressure of the hydraulic pressure generating source 6 is regulated freely for application to the secondary hydraulic pressure path 72 or the boosted hydraulic pressure chamber 9.

Incidentally, the operations of the primary and secondary linear solenoid valves 69, 70 are such as to be controlled according to the amount of brake application effort made by the brake pedal 5.

A detection unit 74 which is adapted to detect the amount of brake application effort, includes, for example: a brush 75 which is mounted on the input piston 50 and a pair of electrically conductive elements 76 . . . which extend in parallel with the axial direction of the input piston 50 so as to change a sliding contact position of the brush 75 as the input piston 50 travels in the axial direction. The electrically conductive elements 76 . . . are mounted on a support member 77 which is mounted at a rear end of the secondary casing 48.

The secondary hydraulic pressure path 72 is such as to be connected to the primary hydraulic pressure path 32 via a tertiary opening and closing valve 78, which is a normally closed solenoid valve, and a second constriction 79.

The primary opening and closing valve 31, which is interposed between the primary hydraulic pressure path 32 and the primary fluid reservoir chamber 29 of the reservoir R, is closed when the hydraulic pressure between the tertiary opening and closing valve 78 and the secondary constriction 79 is higher by a predetermined value than the hydraulic pressure on the secondary fluid reservoir chamber 30. The primary opening and closing valve 31 actuates the pump 63 when the brake pedal is in not operated. Further, when the tertiary opening and closing valve 78 is opened, the primary opening and closing valve 31 is closed and the hydraulic pressure which is obtained by regulating the output hydraulic pressure from the hydraulic pressure generating source 6 by the pressure regulating valve unit 7 can be applied to the common fluid chamber 27 in the master cylinder M.

Moreover, when the brake pedal is not operated, the rear and front master pistons 10, 11 are in their withdrawal limit positions and the rear and front output hydraulic pressure chambers 19, 18 communicate with the front and rear output ports 37, 38, respectively. Hydraulic pressures which can be obtained by regulating the output hydraulic pressure of the hydraulic pressure generating source 6 by the pressure regulating valve unit 7 can be outputted from the front and rear output ports 37, 38. Further, through pressure regulations in the first and second hydraulic pressure modulators 39, 40, the automatic brake control and traction control in the non-brake operated state can be implemented without using an existing vehicle brake control system which includes a pump and a motor for taking in brake fluid from the master cylinder to pressurize and control the wheel brakes irrespective of the operation of the brake pedal.

Next, the function of the first embodiment will be described. When the brake pedal 5 is depressed, attempting to apply the brakes, the input piston 50 travels forwards while compressing the elastic element 51.

Although the volume of the annular chamber 58 on the perimeter of the elastic element 51 is reduced as the input piston 50 travels forwards, since the secondary opening and closing valve 68 opens in response to application of the hydraulic pressure from the hydraulic pressure generating source 6, an increase in the pressure within the annular chamber 58 does not occur, and a reaction force that is applied to the brake pedal 5 at an initial stage of the depression of the brake pedal 5 is only a spring back force from the elastic element 51.

Thus, when an amount of brake application effort made by the brake pedal 5 is detected by the detection unit 74, the pressure regulating valve unit 7 is actuated to operate to regulate the output hydraulic pressure of the hydraulic pressure generating source 6 to a hydraulic pressure which matches the amount of brake application effort so detected. As this occurs, the tertiary opening and closing valve 78 is in a closed state, whereby the hydraulic pressure regulated by the pressure regulating valve unit 7 is applied to the boosted hydraulic pressure chamber 9.

In the tandem master cylinder M, the rear and front master pistons 10, 11 travel forwards against the spring forces of the rear and front return springs 23, 22 as the hydraulic pressure in the boosted hydraulic pressure chamber 9 develops. Thus, the hydraulic pressures generated in the rear and front output hydraulic pressure chambers 19, 18 are outputted from the rear and front output ports 37, 38. Namely, the operations of the rear and front master cylinders 10, 11 in the master cylinder N are boosted, and the boosted brake hydraulic pressure can be made to be applied to the respective wheel brakes BA to BD.

Moreover, since the rear master piston 10 is formed into the stepped configuration in which the end thereof which lies to face the boosted hydraulic pressure chamber 9 (boosted-hydraulic-pressure-chamber side) is reduced in diameter, the amount of brake fluid that is applied to the boosted hydraulic pressure chamber 9 is suppressed to a low level, and the amount of brake fluid consumed by the hydraulic pressure generating source 6 is suppressed, thereby making it possible to reduce the size of the hydraulic pressure generating source 6.

In addition, the pressure regulating valve unit 7 is configured to be electrically driven so as to switch over the states of the vehicle brake apparatus (a) the state where the boosted hydraulic pressure chamber 9 communicates with the hydraulic pressure generating source 6 and the boosted hydraulic pressure chamber 9 is separated from the reservoir R, (b) the state where the boosted pressure chamber 9 is separated from the hydraulic pressure generating source 6 and the boosted pressure chamber 9 communicates with the reservoir R, and (c) the state where the boosted hydraulic pressure chamber 9 is separated from both the hydraulic pressure generating source 6 and the reservoir R. Therefore, the boost ratio can be changed freely according to model lines to which the brake system is attempted to be applied, and the brake system can be applied to many model lines each having a different specification, thereby making it possible to avoid an increase in the number of components involved.

Furthermore, the pressure regulating valve unit 7 includes the normally closed primary linear solenoid valve 69 which is interposed between the hydraulic pressure generating source 6 and the boosted pressure chamber 9 and the normally open secondary linear solenoid valve 70 which is interposed between the boosted hydraulic pressure chamber 9 and the reservoir R. That is, the pressure regulating valve unit 7 can be made to have the simple configuration by only two linear solenoid valves 69, 70.

When the hydraulic pressure generating source 6 fails, the secondary opening and closing valve 68 is closed, whereby the annular chamber 58 lying on the perimeter of the elastic element 51 is put in the hydraulically locked state. Because of this, in the stroke simulator 8, the backup piston 49 travels forwards together with the input piston 50 against the spring force of the spring 52 in response to the depressing operation of the brake pedal 5, and the fitting projection 49a at the leading end of the backup piston 49 is brought into abutment with the rear master piston 10 so as to push the rear master piston 10 in its traveling direction, whereby even when the hydraulic pressure generating source 6 fails, the master cylinder can be put in operation in response to the depressing operation of the brake pedal 5.

Figure 3:
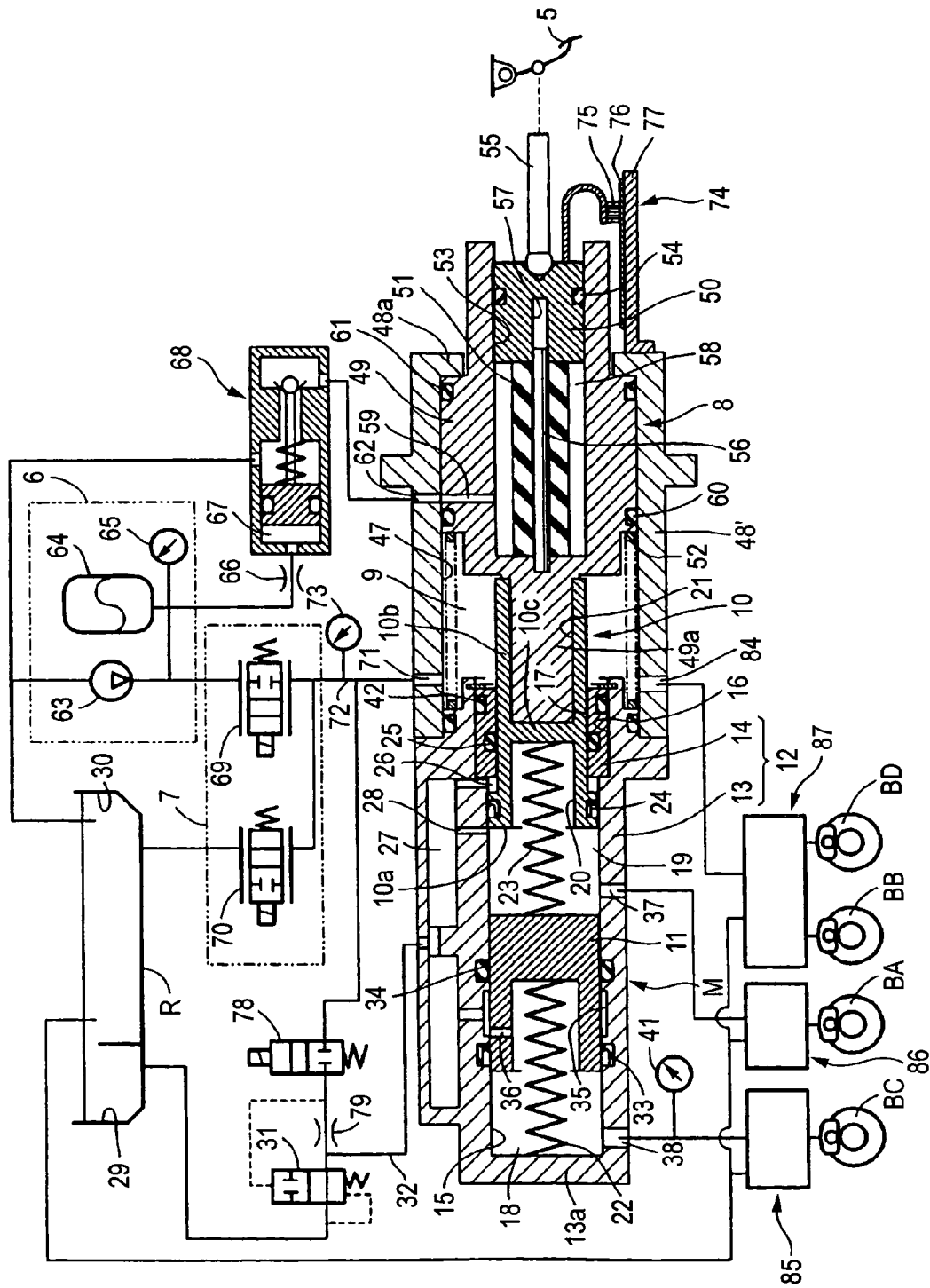
FIG. 3 is a brake hydraulic pressure system diagram showing an overall configuration of a vehicle brake apparatus of a second embodiment.
Figure 4:
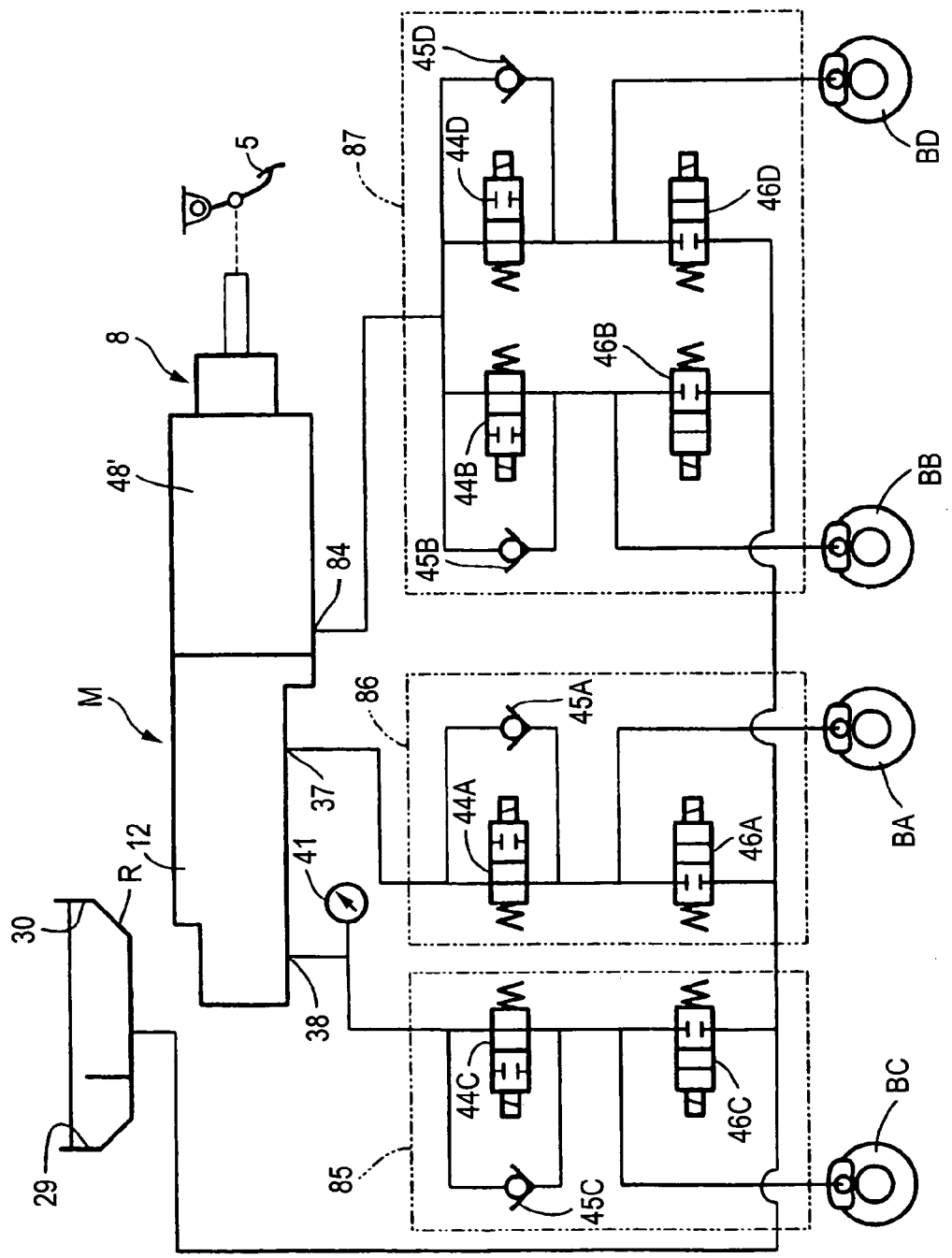
FIG. 4 is a hydraulic pressure circuit diagram showing the configuration of a hydraulic pressure modulator.

FIGS. 3 and 4 show a second embodiment of the invention, in which like reference numerals will be imparted to constituent components thereof which correspond to their counterparts in the first embodiment that has been described above, so that the detailed description thereof will be omitted here.

Firstly, in FIG. 3, a secondary casing 48', which has a tertiary cylinder bore 47 into which a backup piston 49 of a stroke simulator 8 is slidably fitted, is fluid tightly connected to a rear end of a primary casing 12 of a master cylinder M, and an output port 84 is provided in this secondary casing 48' so as to communicate with a boosted hydraulic pressure chamber 9.

In addition, a front output port 38 in the master cylinder M is connected to a wheel brake BC for a left front wheel via a left front wheel hydraulic pressure modulator 85, and a rear output port 37 in the master cylinder M is connected to a wheel brake BA for a right front wheel via a right front wheel hydraulic pressure modulator 86. The output port 84 provided in the secondary casing 48' is connected to a brake wheel BB for a left rear wheel and a brake wheel BSD for a right rear wheel via a rear wheel hydraulic pressure modulator 87.

The rear output port 37 in the master cylinder M is connected to the wheel brake BA for the right front wheel via the right front wheel hydraulic pressure modulator 86, and the output port 84 provided in the secondary casing 48' is connected to the wheel brake BB for the left rear wheel and the wheel brake BD for the right rear wheel via the rear wheel hydraulic pressure modulator 87.

In FIG. 4, the left front wheel hydraulic pressure modulator 85 includes:

a normally open solenoid valve 44C which is interposed between the front output port 38 and the wheel brake BC for the left front wheel;

a one-way valve 45C which is connected in parallel to the normally open solenoid valve 44C so as to permit a flow of brake fluid to the front output port 38 side; and a normally closed solenoid valve 46C which is interposed between the wheel brake BC for the left front wheel and a second fluid reservoir chamber 30 of a reservoir R.

On the other hand, the right front wheel hydraulic pressure modulator 86 includes:

a normally open solenoid valve 44A which is interposed between the rear output port 37 and the wheel brake BA for the right front wheel;

a one-way valve 45A which is connected in parallel to the normally open solenoid valve 44A so as to permit a flow of brake fluid to the rear output port 37 side; and a normally closed solenoid valve 46A which is interposed between the wheel brake BA for the right front wheel and the second fluid reservoir chamber 30 of the reservoir R.

In addition, the rear wheel hydraulic pressure modulator 87 includes:

a normally open solenoid valve 44B which is interposed between the output port 84 and the brake wheel BB for the left rear wheel;

a normally open solenoid valve 44D which is interposed between the output port 84 and the wheel brake BD for the right rear wheel;

one-way valves 45B, 45D which are connected in parallel, respectively, to the normally open solenoid valves 44B, 44B so as to permit a flow of brake fluid to the output port 84 side;

a normally closed solenoid valve 46B which is interposed between the wheel brake BB for the left rear wheel; and a normally closed solenoid valve 46D which is interposed between the wheel brake BD for the right rear wheel and the second fluid reservoir chamber 30 of the reservoir R.

According to the second embodiment, the hydraulic pressure of the boosted hydraulic pressure chamber 9 can be made to be applied directly to the wheel brake DB for the left rear wheel and the wheel brake BD for the right rear wheel.

Thus, while the embodiments of the invention have been described heretofore, the invention is not such as to be limited thereto, and the invention can be modified variously with respect to the design thereof without departing from the spirit and scope of the invention described under the claims.

For example, while in the embodiments, the detection unit 77 for detecting the amount of brake application effort is described as being adapted to detect the stroke amount of the input piston 50, the brake application effort may be detected by a load sensor or the like, or the piston in the master cylinder may be formed to have the same diameter at the front and rear thereof. In addition, in the first embodiment, in place of the primary and secondary hydraulic pressure modulators 39, 40, an existing anti-lock brake control unit may be used with a motor and a pump provided.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake apparatus comprising:
    a boosted hydraulic pressure chamber;
    a master cylinder comprising:
        a master piston of which back side faces the boosted hydraulic pressure chamber; and
        a casing accommodating the master piston in a slidable manner;
    a hydraulic pressure generating source;
    a reservoir; and
    a pressure regulating valve unit which regulates output hydraulic pressure of the hydraulic pressure generating source in response to an input of brake application effort from a brake operation member for application to the boosted hydraulic pressure chamber; and
    a detection unit which detects an amount of the brake application effort of the brake operation member,
    wherein the master cylinder is connected to wheel brakes,
    in accordance with a detection value of the detection unit the pressure regulating valve unit is electrically driven to switch over following states of the vehicle brake apparatus:
        a state where the boosted hydraulic pressure chamber communicates with the hydraulic pressure generating source and the boosted hydraulic pressure chamber is separated from the reservoir;
        a state where the boosted hydraulic pressure chamber is separated from the hydraulic pressure generating source and the boosted pressure chamber communicates with the reservoir; and
        a state where the boosted hydraulic pressure chamber is separated from both the hydraulic pressure generating source and the reservoir; and
    wherein the master piston is formed into a stepped configuration, comprising:
        a larger diameter portion at front end; and
        a smaller diameter portion at a rear end corresponding to a side of the boosted hydraulic pressure chamber, the smaller diameter portion being slidable on a secondary bore cylinder.

2. The vehicle brake apparatus as set forth in claim 1, wherein the pressure regulating valve unit comprises: a primary linear solenoid valve which is interposed between the hydraulic pressure generating source and the boosted hydraulic pressure chamber; and a secondary linear solenoid valve which is interposed between the boosted hydraulic pressure chamber and the reservoir.

3. The vehicle brake apparatus as set forth in claim 1, wherein the master piston is formed into a stepped configuration in which a boosted-hydraulic-side thereof is reduced in diameter.

4. The vehicle brake apparatus as set forth in claim 1, wherein the boosted hydraulic pressure chamber is defined by a small diameter portion of the master piston and a surface of a secondary casing attached to the casing.

5. The vehicle brake apparatus as set forth in claim 4, wherein the boosted hydraulic pressure chamber is in direct communication with a communication hole provided in the secondary casing.

6. The vehicle brake apparatus as set forth in claim 5, further comprising a spring positioned within the boosted hydraulic pressure chamber.

7. The vehicle brake apparatus as set forth in claim 6, wherein the spring is provided in a compressed state between the casing and a backup piston.

8. The vehicle brake apparatus as set forth in claim 7, wherein the backup piston is slidably fitted in a tertiary cylinder bore in such a manner that its withdrawal limit position is restricted by an inwardly extending flange portion provided at a rear end of the secondary casing.

9. The vehicle brake apparatus as set forth in claim 1, further comprising a backup piston which defines the boosted hydraulic pressure chamber.

10. The vehicle brake apparatus as set forth in claim 9, wherein the backup piston is a rear part of the master piston.

11. The vehicle brake apparatus as set forth in claim 1, further comprising a hydraulic pressure path in communication with a communication hole communicating directly with the boosted hydraulic pressure chamber, the pressure regulating valve unit and a tertiary opening and closing valve, which is a normally closed solenoid valve.

12. The vehicle brake apparatus as set forth in claim 11, further comprising a primary opening and closing valve, which is interposed between a primary hydraulic pressure path and the reservoir.

13. The vehicle brake apparatus as set forth in claim 12, wherein the primary hydraulic pressure path is in communication with a common fluid chamber in the master cylinder.

14. The vehicle brake apparatus as set forth in claim 12, wherein the primary opening and closing valve is disposed between the reservoir and the tertiary opening and closing valve.

15. The vehicle brake apparatus as set forth in claim 14, further comprising a constriction disposed between the tertiary opening and closing valve and the primary opening and closing valve.

16. The vehicle brake apparatus as set forth in claim 15, wherein the primary opening and closing valve is closed when the hydraulic pressure between the tertiary opening and closing valve and the secondary constriction is higher by a predetermined value than the hydraulic pressure on the reservoir.

17. The vehicle brake apparatus as set forth in claim 12, wherein the primary opening and closing valve actuates a pump when the brake operation element is in not operated.

18. The vehicle brake apparatus as set forth in claim 12, wherein when the tertiary opening and closing valve is opened, the primary opening and closing valve is closed and the hydraulic pressure which is obtained by regulating an output hydraulic pressure from the hydraulic pressure generating source by the pressure regulating valve unit can be applied to a common fluid chamber in the master cylinder.

19. The vehicle brake apparatus as set forth in claim 1, wherein the detection unit includes a brush which is mounted on an input piston and a pair of electrically conductive elements which extend in parallel with an axial direction of the input piston so as to change a sliding contact position of the brush as the input piston travels in the axial direction.

20. The vehicle brake apparatus as set forth in claim 19, wherein the electrically conductive elements are mounted on a support member mounted at a rear end of a secondary casing, the secondary casing is fluid tightly connected to a rear end of the casing.

* * * * *